United States Patent Office 3,492,110
Patented Jan. 27, 1970

---

3,492,110
TRIAZINE HERBICIDE FORMULATIONS
John J. Hood, New York, and John D. Van Geluwe, Chappaqua, N.Y., assignors to Geigy Chemical Corporation, Ardsley, N.Y., a corporation of New York
No Drawing. Filed May 13, 1968, Ser. No. 728,754
Int. Cl. A01n 9/22
U.S. Cl. 71—93                 4 Claims

ABSTRACT OF THE DISCLOSURE

Compositions containing 2-t-butylamino-4-ethylamino-6-methylthio-s-triazine and 2-chloro-4-t-butylamino-6-ethylamino-s-triazine effectively control weeds and have low phytotoxicity to corn and sorghum.

---

This invention is concerned with new compositions for killing weeds and with methods for their use. More particularly, it relates to herbicidal compositons comprising 2 - t-butylamino-4-ethylamino-6-methylthio-s-triazine and 2-chloro-4-t-butylamino-6-ethylamino-s-triazine.

The term "weeds" as used herein includes the various broadleaf varieties of plants and also the grasses. In particular, the broadleaf weeds referred to include morning glory (*Ipomoea purpurea*), pigweed (*Amaranthus retroflexus*), coffee weed (Sesbania spp.), and prickly sida (*Sida spinosa*), and the grasses referred to include Johnsongrass (*Sorghum halepense*).

These weeds interfere seriously with the growth of corn, sorghum and other crops and, at this time, only limited control is possible with presently employed herbicides.

It has been particularly difficult to control the growth of Johnsongrass in sorghum and corn fields without also causing undesirable injury to the crop. Many of the s-triazine compounds described in U.S. Patent No. 2,909,420, such as 2-methoxy-4,6-bis-(isopropylamino)-s-triazine, are quite effective against a wide range of weeds but are not generally sufficiently active against Johnsongrass at concentrations which are safe for crops. Fairly good control of Johnsongrass in sorghum fields has been obtained by preemergent application of 2-t-butylamino-4-ethylamino-6-methylthio-s-triazine

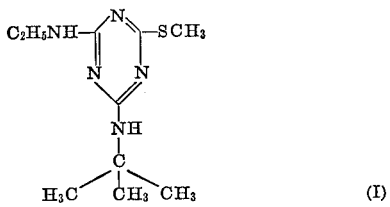

(I)

with no appreciable damage to the crop.

It has now been discovered that plant-growth influencing compositions containing 2 - t - butylamino - 4 - ethylamino-6-methylthio-s-triazine of Formula I in combination with 2-chloro-4-t-butylamino-6-ethylamino-s-triazine

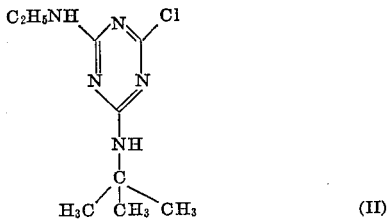

(II)

give excellent control of Johnsongrass and broadleaf weeds with no significant damage to sorghum or corn. These two compounds differ from each other only in that the methylthio group of Formula I is replaced by a chlorine ion in Formula II. Hence, the compound of Formula I will also hereinafter be referred to as "the methylthio compound" and the compound of Formula II, as "the chloro compound."

The chloro compound is prepared by methods taught in U.S. Patent No. 2,891,855. Used alone, its herbicidal effect on Johnsongrass is low and its use in therefore not an acceptable method of control. The methylthio compound is prepared by methods taught in U.S. Patent No. 2,909,420. Both compounds used singly are virtually non-phytotoxic to sorghum and their use in combination results in no appreciable rise in phytotoxicity.

The process of the instant invention is essentially a method of killing weeds in crop fields which comprises applying to the area in which the crop is grown, prior to the emergence of the crop, in an amount sufficient to kill the weeds, a composition comprising the methylthio compound of Formula I and the chloro compound of Formula II.

It has also been discovered that compositions of the instant invention, when incorporated into the soil prior to planting crops such as corn and sorghum, cause surprisingly little damage to the crop. The already low degree of phytotoxicity exhibited by the chloro compound and the methylthio compound used singly is diminished by the use of the two compounds in combination.

The plant growth influencing compositions according to the invention are conveniently applied as either solutions, emulsions, suspensions or dusts according to the intended use. All application forms, however, must contain the active substances in fine distribution. For selective inhibition of plant growth, e.g., selective weed killing, it is preferred to use indifferent carriers, rather than carriers which are phytotoxic themselves.

Dusts can be produced by mixing or blending the active ingredients with a solid carrier. Examples of such are: talcum, diatomaceous earth, kaolin, bentonite, calcium carbonate, boric acid, tricalcium phosphate or also sawdust, powdered cork, charcoal and other materials of vegetable origin. On the other hand, the carriers can be impregnated by means of a volatile solvent. Dusts and pastes can be suspended in water by the addition of wetting agents and protective colloids and so used as spraying agents.

Liquid concentrates for aqueous emulsions and wettable powders for aqueous suspensions can be prepared both from liquid and solid active compounds. However liquid active substances or solid active substances are more suitable for the preparation of liquid concentrates or of wettable powders of higher concentration, respectively. The various forms of application can be adapted to the intended use in the usual way by the addition of substances which improve the distribution, the adhesive properties, resistance to rain, and, possibly, the resorption. Such substances are: e.g. fatty acids, resins, wetting agents, glue, casein or alginates. In the same way, the biological activity can be increased or amplified by the addition of substances which have a bactericidal or fungicidal action or of substances which also influence the growth of plants, as well as by combination with fertilizers.

The amounts of ingredients of the present compositions may be varied widely. Customarily, the amounts of compounds used are stated on the basis of pounds used for the treatment of an acre. The triazines are effective at as little as 1 pound per acre and, while this amount may be increased to as much as 50 pounds per acre, large quantities are not required for effective weed killing. From about 2 to about 8 pounds per acre of total active ingredients is a sufficient amount, with about 2 to about 3 pounds per acre being preferred. Good results are obtained when the methylthio compound and the chloro compound are admixed in the ratio of 80:20 to 20:80 respectively. Comsitions comprising these compounds in about equal parts by weight are convenient for use and are preferred.

The following example is illustrative of the processes and compositions of this invention. Ratings for crop response and weed control are on a 0 to 10 scale with 0 indicating no effect and 10 indicating complete kill.

Example

Compositions containing 2-t-butylamino-4-ethylamino-6-methylthio-s-triazine as the sole active ingredient, 2-chloro-4-t-butylamino-6-ethylamino-s-triazine as the sole active ingredient, and combinations of the two were applied in amounts of 2 and 3 pounds of active ingredient per acre to fields of sorghum in Mississippi. The applications were made immediately after planting, and thus prior to emergence of the weeds and the crop. The predominant weed species were Johnsongrass and various broadleaf weeds including morning glory, pigweed, coffee weed and prickly sida. Weed control and crop response were observed approximately 5 weeks after application. The results are listed in the following table, in which the observed data represent the average of 4 replications for each entry.

| Active ingredient | Lbs. per acre | Johnson-grass | Crop response |
|---|---|---|---|
| 2-t-butylamino-4-ethylamino-6-methylthio-s-triazine. | 2 | 4.3 | 0.5 |
|  | 3 | 7.5 | 0.0 |
| 2-chloro-4-t-butylamino-6-ethylamino-s-triazine. | 2 | 1.0 | 0.5 |
|  | 3 | 1.0 | 0.3 |
| 2-t-butylamino-4-ethylamino-6-methylthio-s-triazine + 2-chloro-4-t-butylamino-6-ethylamino-s-triazine. | 1+1 | 6.6 | 0.0 |
|  | 1½+1½ | 8.2 | 0.3 |

On the broadleaf weeds, the two compounds used singly and in combination gave excellent control.

These data illustrate the increased effectiveness of the methylthio and chloro compounds when they are used in combination over their effectiveness when each is the sole active ingredient. Particularly of low concentrations, e.g. 2 pounds of active ingredient per acre, the combination of these two compounds shows a marked synergistic effect in controlling Johnsongrass wtih no attendant increase in the already low degree of crop damage.

The compositions of this invention may also include any one or more of the additives commonly used in this field such as the various wetting or dispersing agents, solvents, protective colloids, spreading agents, adhesives and the like, without affecting the weed-killing activity of the compositions.

Suitable other changes and variations may be adopted without departing from the spirit and scope of the invention as defined in the claims.

What is claimed is:
1. A method of killing Johnsongrass in sorghum fields without substantially injuring the sorghum, which method comprises applying to the soil, prior to emergence of the crop, in an amount sufficient to kill the Johnsongrass, a composition consisting essentially of from 20% to 80% of 2 - t - butylamino-4-ethylamino-6-methylthio-s-triazine and from 80% to 20% of 2-chloro-4-t-butylamino-6-ethylamino-s-triazine.

2. The method of claim 1 in which the composition is applied in a concentration of from about 2 pounds to about 3 pounds per acre.

3. The method of claim 1 in which the composition is applied in a concentration of about 2 pounds per acre.

4. A composition for killing Johnsongrass in sorghum fields which composition consists essentially of from 20% to 80% of 2-t-butylamino-4-ethylamino-6-methylthio-s-triazine and from 80% to 20% of 2-chloro-4-t-butylamino-6-ethylamino-s-triazine.

References Cited

UNITED STATES PATENTS

| 2,891,855 | 6/1959 | Gysin et al. | |
| 2,909,420 | 10/1959 | Gysin et al. | |
| 3,145,208 | 8/1964 | Knusli et al. | 71—93 |
| 3,149,953 | 9/1964 | Miller | 71—93 |
| 3,374,083 | 3/1968 | Loux | 71—93 |
| 3,393,991 | 7/1968 | Hamm | 71—93 |
| 3,402,040 | 9/1968 | Fassig | 71—93 |

FOREIGN PATENTS 1,194,198   6/1965   Germany.

OTHER REFERENCES

Konstantinov: Soil Herbicides in the Control of Potato Weeds (1965), CA64, p. 16,549 (1966).

LEWIS GOTTS, Primary Examiner

G. HOLLRAH, Assistant Examiner